United States Patent Office 3,274,149
Patented Sept. 20, 1966

---

3,274,149
OXYMETHYLENE POLYMERS STABILIZED WITH AMINO SUBSTITUTED AMIDES
Frank M. Berardinelli, South Orange, N.J., assignor to Celanese Corporation of America, New York, N.Y., a corporation of Delaware
No Drawing. Filed Feb. 13, 1963, Ser. No. 258,126
8 Claims. (Cl. 260—45.8)

This invention relates to polymers which are structurally related to polyoxymethylene and particularly to polymers of high thermal stability. This invention also relates to a method for improving the thermal stability of polymers. This application is a continuation-in-part of application Serial No. 838,427, filed September 8, 1959, now abandoned.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in U.S. Patent No. 2,989,506 of Hudgin and Berardinelli.

Although polyoxymethylenes prepared by some methods are much more stable against thermal degradation than those prepared by other methods, it is nevertheless desirable for many uses that the thermal stability be increased.

In accordance with the present invention the heat stability of oxymethylene polymers is enhanced by the incorporation therein of a compound having both amine and amide groups and having from 0.2 to 5 amide groups per amino nitrogen atom. For convenience purposes, compounds of this type are hereinafer designated as "amine-amides." Suitable "amine-amides" include compounds having the structure:

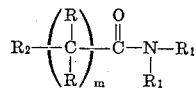

wherein $m$ is an integer from 2 to 7; $R_1$ is hydrogen or a lower alkyl having up to about five carbon atoms; $R_2$ contains at least one amino group; R and $R_2$ consist solely of carbon, hydrogen, oxygen, nitrogen, and halogen atoms; and may suitably be hydrogen, a saturated or unsaturated aliphatic group having up to twenty carbon atoms, a saturated or unsaturated cyclic group having up to twenty carbon atoms, an amino group, an amido group, and substituted derivatives thereof (where the substituents are inert; that is, do not cause undesirable reactions).

In the specification and the claims, it is understood and hereby designated that any of the R or $R_1$ groups may be identical or different (e.g., the amide group may be monalkylated); the $R_2$ or R groups may be joined to the carbon atoms of the aforementioned structure through an unsaturated linkage; the term "amino" designates the

group; the term "amido" designates the

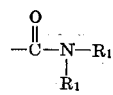

group; and the term "cyclic" shall include heterocyclic as well as carbocyclic groups, wherein the nuclear atoms may be carbon, nitrogen, or oxygen.

A preferred class of "amine-amides" consist of compounds where $R_1$ is hydrogen, the amine groups are tertiary amine groups, and where there are from one to three amide groups per amino nitrogen atom. Preferably, at least one amido group is located at a terminus of the molecule and has been designated in the specification and the claims as the "terminal amido" group. In a preferred embodiment where the $R_1$ groups are hydrogen, said amido group is directly bonded to the ω-carbon atom. Of course, the R and $R_2$ groups may also contain one or more additional amino or amido groups in their structures.

Representative "amine-amides" include those having the structure:

(A)

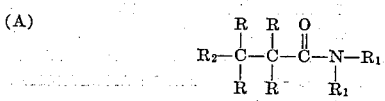

wherein $R_2$ includes an amino group having R substituents such as, for example, $\beta,\beta',\beta''$ nitrilo tripropionamide

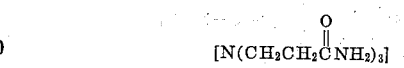

methylnitrilo $\beta,\beta'$ dipropionamide; ethylnitrilo $\beta,\beta'$ dipropionamide; $\gamma,\gamma',\gamma''$ nitrilo tributyramide; dimethyl nitrilo $\gamma$-butyramide; dimethyl nitrilo δ-pentamide; dimethyl nirilo $\beta$-propionamide;

(B)

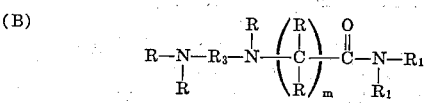

wherein $R_3$ includes saturated or unsaturated aliphatic groups having up to twenty carbon atoms, saturated or unsaturated cyclic groups having up to twenty carbon atoms, and substituted derivatives thereof such as, for example, bis(N-$\beta$ propionamido, N-ethyl)methane

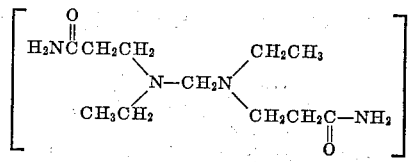

bis(N,N-$\beta$-propionamido)methane; bis(N-$\beta$-propionamido, N-ethyl)ethane; bis(N-$\gamma$ butyramido, N-methyl)methane; bis(N,N-γ butyramido)ethane(N,N-diethyl,N'-methyl-N'-β propionamido)methane (C) 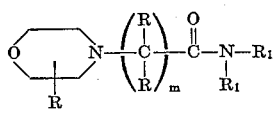

such as, for example β-(4 morpholinyl) propionamide

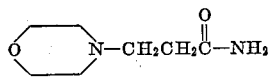

γ-(4 morpholinyl)butyramide; 2-methyl, 4-β-propionamido morpholine; δ-(4-morpholinyl)pentamide; 2-methyl,4-γ-butyramido morpholine;

(D) 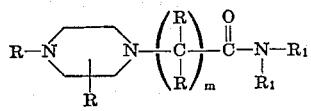

such as, for example, N,N'-di-β-propionamido piperazine

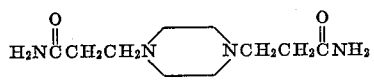

N,N'-di-γ butyramido piperazine; 2,5 dimethyl, 1,4 di-β-propionamido piperazine; N methyl, N'-β-propionamido piperazine; N-β-propionamido, N'-γ butyramido piperazine;

(E) 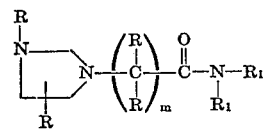

such as, for example, N,N'-di-β-propionamido imidazolidine

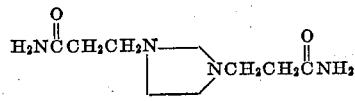

N-methyl, N'-β-propionamido imidazolidine; N-β-propionamido, N'-γ-butyramido imidazolidine; N-ethyl, N'-β-propionamido imidazolidine; N-methyl, N'-γ-butyramido imidazolidine; N,N'-di-γ-butyramido imidazolidine; N-methyl; N'-δ-pentamido imidazolidine (F) 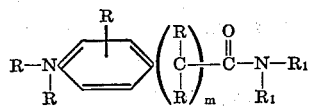

such as, for example, N,N-dimethyl-p-β-propionamido aniline

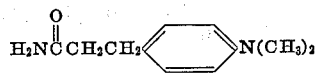

N,N,diethyl-p-β-propionamido aniline; N,N,dimethyl-p-γ-butyramido aniline; N,N-dimethyl-p-δ-pentamido aniline; N,N dimethyl-2 methyl-(4-β-propionamido aniline; N-β-propionamido, N-methyl-p-β-propionamido aniline (G) 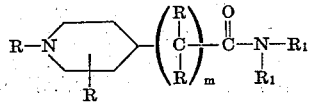

such as, for example, 1-methyl, 4-β-propionamido piperidine

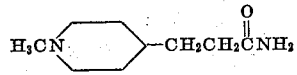

1-methyl, 4-γ-butyramido piperidine; 1,4 di-β-propionamido piperidine; 1-ethyl, 4-δ-pentamido piperidine; 1-methyl, 3-methyl 4-β-propionamido piperidine.

Particular suitable "amine-amides" are the propionamide derivatives, wherein the propionamide structure

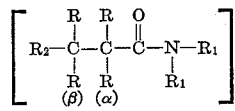

may be α or β substituted (with reference to the carbonyl functional group).

In a particularly preferred embodiment of our invention the "amine-amide" compounds are added to an oxymethylene copolymer having at least one chain containing recurring oxymethylene (—OCH$_2$—) units interspersed with —OR— groups in the main polymer chain where R is a divalent radical containing at least two carbon atoms directly linked to each other and positioned in the chain between the two valences with any substituents on said R radical being inert, that is, those which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which are utilized in accordance with this aspect of the invention are those having a structure comprising recurring units having the formula

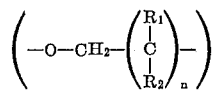

wherein $n$ is an integer from zero to 5 and wherein $n$ is zero in from 60 to 99.6 percent of the recurring units. $R_1$ and $R_2$ are inert substituents, that is, substituents which will not cause undesirable reactions.

A preferred class of copolymers are those having a structure comprising recurring units wherein from 60 to 99.6 percent of the recurring units are oxymethylene units. These copolymers are prepared by copolymerizing trioxane with a cyclic ether having the structure

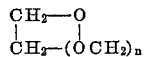

where $n$ is an integer from zero to two.

Examples of preferred polymers include copolymers of trioxane and cyclic ethers containing at least two adjacent carbon atoms such as the copolymers disclosed in U.S. Patent No. 3,027,352.

Among the specific ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment. For example, if a sample of the treated polymer of this invention is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time.

The preferred polymers which are treated in this invention have an inherent viscosity of at least one (measured at 60° C. in an 0.1 weight percent solution in p-chlorophenol containing 2 weight percent of α-pinene). The preferred copolymers of this invention exhibit remarkable alkaline stability. For example, if the preferred copolymers are refluxed at a temperature of about 142°–145° C. in a 50% solution of sodium hydroxide in water for a period of 45 minutes, the weight of the copolymer will be reduced by less than one percent.

The preferred catalysts used in the preparation of the desired copolymers or homopolymers, are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed to obtain highest molecular weight polymers.

In one suitable method of preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increase both the oxymethylene and the oxyethylene content of the polymer molecule.

In general, the cyclic ether is present in the copolymer reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers in accordance with this preferred aspect of the invention have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent 2,989,509 of Donald E. Hudgin and Frank M. Berardinelli.

In a preferred embodiment of this invention of the polymer composition it also contains a phenolic material and preferably an alkylene bisphenol as a thermal stabilizer. It appears that the stabilization action of the "amine-amides" and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benezene ring, each alkyl substituent having from 1 to 4 carbon atoms. The preferred alkylene bisphenols are 2,2'-methylene bis-(5-methyl-6-tertiary butyl phenol) and 4,4'-butylidene bis-(6-tertiary butyl-3-methyl phenol).

Other suitable phenolic stabilizers are the trisphenols, having the formula:

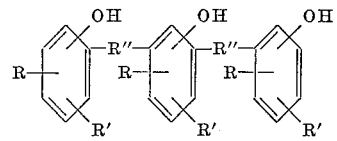

wherein R and R' are selected from the group consisting of hydrogen and lower alkyl groups (e.g. having up to five carbon atoms), and R" is a lower alkylene group (e.g. having up to five carbon atoms). R and R' may, for example, be hydrogen, methyl, ethyl, propyl, isopropyl, or tertiary butyl, and R" may be methylene, ethylene, propylene, ethylidene, butylidene. In a preferred class R" is an alkylene group having two bonds on the same carbon atom (alkylidene group), i.e., a methylene or alkyl-substituted methylene group. The preferred trisphenol is 2,6-bis-(2'-hydroxy-3'-tertiary butyl-5'-methylbenzyl)-4-methyl phenol.

Other suitable phenolic stabilizers include 2,6-ditertiary butyl-4-methyl phenol, p-phenylphenol and octylphenol.

The "amine-amide" is generally admixed with the oxymethylene polymer in amounts not exceeding 10%, based on the weight of the oxymethylene polymer, and preferably in amounts between about 0.05 and 2% weight percent. The alkylene bisphenol, when used, is admixed in amounts not exceeding 5% weight percent and preferably from about 0.05 to about 2% weight percent.

The "amine-amides" and the alkylene bisphenols, if desired, may be admixed intimately with the oxymethylene polymer by being applied in solution in a suitable solvent to the finely divided solid oxymethylene polymer followed by evaporation of the solvent. Water is a suitable solvent for β, β', β''-nitrilo tripropionamide and acetone is a suitable solvent for β-4-morpholinyl propionamide.

The admixture may also be made by dry blending the finely divided oxymethylene polymer and finely divided stabilizers or by milling the stabilizers into the polymer as the latter is worked on a rubber mill.

The compositions of this invention may also include, if desired, plasticizers, fillers, pigments and other stabilizers, such as stabilizers against degradation by ultraviolet light.

*Example 1*

Four batches of trioxane-dioxolane copolymer were prepared in a kneading mixer. In each batch cyclohexane was present to the extent of ¼ the weight of the trioxane and the dioxolane concentration was 5 wt. percent of the total monomer. Reaction temperatures between 51° and 66° C. were used and reaction periods of 2 hours. The polymer yields were between 83 and 87%, based on total monomer and the inherent viscosities measured at 60° C. in a 0.1 wt. percent solution in p-chlorophenol (containing 2 wt. percent of alpha-pinene) were between 1.3 and 1.6. The four batches were blended in a Patterson-Kelley blender to form a uniform admixture having an inherent viscosity (measured as above) of 1.4. The blender is made up of two cylindrical chambers which meet at a vertex to form a V. The blender rotates rapidly about an axis which bisects both arms of the V. The blended polymer contained 5.1 wt. percent of monomeric units derived from dioxolane and had a melting range of 163–183° C.

Fifty parts by weight of the above-described copolymer, 0.5 part of 2,2'-methylene bis (4-methyl-6-tertiary butyl phenol) and 0.5 part of $\beta,\beta',\beta''$-nitrilo tripropionamide were milled at a temperature of 200–202° C. for 45 minutes in a heated chamber wherein the plastic mass was worked with sigma type blades. The thermal degradation rate of the treated copolymer (measured in an open vessel in a circulating air oven at 222° C.) was 0.025 wt. percent/min. Prior to treatment, the degradation rate (measured as above) was 3.0 wt. percent/min.

*Example II*

Example I was repeated except that the phenolic stabilizer was 4,4-butyliene bis (6-tertiary butyl-3-methyl phenol) and the tertiary amine-amide was $\beta$-4-morpholiny propionamide. The degradation rate (measured as above) was 0.04 wt. percent/min.

*Example III*

Example I was repeated except that the phenolic stabilizer was omitted and only 0.2 part of $\beta,\beta',\beta''$-nitrilo tripropionamide was used. The degradation rate (measured as above) was 0.16 wt. percent/min. for the first 3% of polymer degraded and 0.40 wt. percent/min. for the remainder.

*Example IV*

Example III was repeated except that the proportion of $\beta,\beta',\beta''$-nitrilo propionamide was further cut to 0.1 part and that 0.05 part of 4,4' butylidene bis (6-tertiary butyl-3-methyl phenol) was also included. The degradation rate measured as above was 0.04 wt. percent/min. It is to be noted that the stability of the polymer of Example IV, where a mixture of stabilizers was used, is substantially better than that of the polymer of Example III despite the fact that the total stabilizer weight was less in Example IV.

It is to be understood that the foregoing detailed description is given merely by way of illustration and that many variations may be made therein without departing from the spirit of my invention.

Having described my invention what I desire to secure by Letters Patent is:

1. A polymer composition comprising an oxymethylene polymer having a melting point of at least 150° C. and a stabilizing amount of a compound having the structure

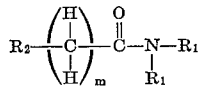

wherein $m$ is an integer from two to seven; $R_1$ is hydrogen or a lower alkyl having up to about five carbon atoms; $R_2$ is amino, lower alkyl-substituted amino, lower alkyl-amido-substituted amino, 4-morpholinyl, lower alkyl-substituted-4-morpholinyl, N-piperazinyl, N'-alkylamido-substituted-N-piperazinyl, lower alkyl-substituted-N-piperazinyl, N-imidazolidinyl, N'-lower alkylamido-substituted-N-imidazolidinyl, lower alkyl-substituted-N-imidazolidinyl, 4- anilinyl, lower alkyl-substituted anilinyl, 4-piperidinyl, lower alkyl-substituted piperidinyl, lower alkylamido-substituted piperidinyl.

2. The polymer composition of claim 1 wherein said polymer is an oxymethylene copolymer having at least one chain containing at least 60 mol percent recurring oxymethylene (—OCH$_2$—) units interspersed with —OR— groups in the main polymer chain where R is a divalent radical containing at least two carbon atoms directly linked to each other and positioned in the chain between the two valences, with any substituents on the R radical being inert.

3. The composition of claim 1 wherein said composition also comprises a stabilizing amount of a stabilizer selected from the group consisting of (a) an alkylene bisphenol having from 1 to 4 carbon atoms in the alkylene group and having from 0 to 2 alkyl substituents on each benzene ring, each alkyl substituent having from 1 to 4 carbon atoms and (b) a trisphenol having the formula

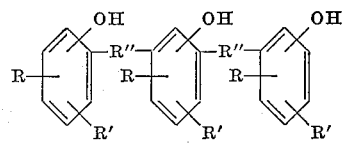

wherein R and R' are each selected from the group consisting of hydrogen and lower alkyl having up to 5 carbon atoms, and R'' is a lower alkylene group having up to 5 carbon atoms.

4. The composition of claim 2 wherein said composition also comprises a stabilizing amount of a stabilizer selected from the group consisting of (a) an alkylene bisphenol having from 1 to 4 carbon atoms in the alkylene group and having from 0 to 2 alkyl substituents on each benzene ring, each alkyl substituent having from 1 to 4 carbon atoms and (b) a trisphenol having the formula

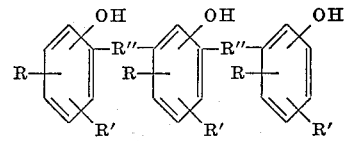

wherein R and R' are each selected from the group consisting of hydrogen and lower alkyl having up to 5 carbon atoms, and R'' is a lower alkylene group having up to 5 carbon atoms.

5. The polymer composition of claim 3 wherein said alkylene bisphenol is 2,2'-methylene-bis (4-methyl-6-tertiary butyl phenol).

6. The polymer composition of claim 4 wherein said alkylene bisphenol is 4,4'-butylidene-bis (6-tertiary butyl-3-methyl phenol).

7. A polymer composition comprising a moldable oxymethylene polymer and a stabilizing amount of $\beta$-(4-morpholinyl) propionamide, said oxymethylene polymer containing oxyethylene groups and containing from 60 to 99.6 mol percent of oxymethylene groups.

8. A polymer composition comprising a moldable oxymethylene polymer and a stabilizing amount of $\beta,\beta',\beta''$ nitrilo tripropionamide, said oxymethylene polymer containing oxyethylene groups and containing from 60 to 99.6 mol percent of oxymethylene groups.

References Cited by the Examiner

UNITED STATES PATENTS

| | | | |
|---|---|---|---|
| 2,966,476 | 12/1960 | Kralovec | 260—45.9 |
| 3,116,267 | 12/1963 | Dolce | 260—45.9 |
| 3,131,165 | 4/1964 | Hermann et al. | 260—45.9 |

FOREIGN PATENTS 224,428  1/1958  Australia.

LEON J. BERCOVITZ, *Primary Examiner.*

H. E. TAYLOR, JR., *Assistant Examiner.*